United States Patent
Goudreault

[11] Patent Number: 5,878,769
[45] Date of Patent: Mar. 9, 1999

[54] MAINTENANCE METHOD AND MAINTENANCE KIT FOR A GATE VALVE

[75] Inventor: Pierre Goudreault, Québec, Canada

[73] Assignee: Hydro-Quebec, Montreal, Canada

[21] Appl. No.: 868,990

[22] Filed: Jun. 4, 1997

[51] Int. Cl.[6] .............................. F16K 43/00; F16K 41/02
[52] U.S. Cl. .................... 137/15; 29/221.6; 29/890.121; 29/980.124; 137/315; 137/312; 251/214
[58] Field of Search ................................ 29/213.1, 221.6, 29/890.121, 890.124; 137/15, 315, 312; 251/214, 266, 267, 326, 327, 328, 329

[56] References Cited

U.S. PATENT DOCUMENTS

| | | | |
|---|---|---|---|
| 955,334 | 4/1910 | Hosfer | 137/315 |
| 1,433,139 | 10/1922 | Lofton | 251/266 |
| 2,373,020 | 4/1945 | Doster | 137/315 |
| 2,746,470 | 5/1956 | Laird | 137/15 |
| 2,757,897 | 8/1956 | Cline | 251/266 |
| 2,780,233 | 2/1957 | Volpin | 251/267 |
| 2,809,059 | 10/1957 | Hillis | 137/315 |
| 4,327,760 | 5/1982 | Lancaster | 137/15 |
| 4,394,872 | 7/1983 | Schobl | 137/315 |

OTHER PUBLICATIONS

Article published by Hydro–Québec in Jan. 1995, entitled "Une idé–maison pour épargner temps et argent" / A home-–made idea to same time and money.

Primary Examiner—George L. Walton
Attorney, Agent, or Firm—Foley & Lardner

[57] ABSTRACT

The maintenance method is for a gate valve. The method comprises the steps of closing the gate valve; removing sequentially the hand wheel, the gland flange, the gland and the packing from the stem of the gate valve; mounting a first clamp onto the gate valve to keep the disc of the valve in an obturating position; untying the packing box and sliding it at least partially along the stem. The method further comprises the steps of removing the packing ring from the shouldering of the stem; mounting a second clamp onto the gate valve to keep the disc in the obturating position; removing the first clamp from the stem; sliding and removing the packing box and the packing ring from the stem; inserting a new packing ring along the stem; putting back the packing box along the stem; mounting again the first clamp onto the gate valve; removing the second clamp from the shouldering; and positioning the new packing ring onto the shouldering of the stem.

6 Claims, 14 Drawing Sheets

MAINTENANCE METHOD AND MAINTENANCE KIT FOR A GATE VALVE

The present invention relates to a maintenance method for a gate valve, and to a maintenance kit to perform the method.

BACKGROUND

Valves, which are used to control the flow of liquids in conduits, are known to degrade with time by wear and ageing. More specifically gate valves have a body, a hand wheel for closing or opening the valve by means of a stem provided with a first end connected to the hand wheel and a second end connected to a disc for obturating the valve, and several components placed together around and along the stem. These components include, starting from the one of the components that is closest to the hand wheel, a gland flange, a gland, a packing, a packing box and a packing ring. The packing ring is squeezed between a shouldering of the stem and the packing box. The packing ring which is for preventing leaks has to be changed regularly.

Traditionally, to change the packing ring on a gate valve, one has to shut down the flow of liquid in the conduits before and after the valve, drain the liquid from the valve and surrounding conduits, remove the gate valve from the surrounding conduits and send it from the workplace to a maintenance workshop where the valve is disassembled and verified. When the valve is in good order, it is sent back to the workplace where it is connected to the conduits. Then the flow of liquid is re-established before and after the valve.

It is an object of the present invention to provide a maintenance method and a maintenance kit for a gate valve, allowing a maintenance thereof that is faster than the one of the prior art.

It is another object of the present invention to provide a maintenance method and a maintenance kit for a gate valve, allowing a maintenance thereof that is less expensive than the one of the prior art.

It is another object of the present invention to provide a maintenance method and a maintenance kit for a gate valve, allowing a maintenance of the gate valve without a removal thereof from the surrounding conduits.

SUMMARY OF THE INVENTION

According to the present invention, there is provided a maintenance method for a gate valve which has a body, a hand wheel for closing or opening the valve by means of a stem provided with a first end connected to the hand wheel and a second end connected to a disc for obturating the valve, and several components placed together around and along the stem, which, starting from the one of the components that is closest to the hand wheel, include a gland flange, a gland, a packing, a packing box and a packing ring, the packing ring being squeezed between a shouldering of the stem and the packing box, the method comprising the steps of:

(a) closing the gate valve by means of the hand wheel, and stopping operation of equipments operating with the gate valve;

(b) removing sequentially the hand wheel, the gland flange, the gland and the packing from the stem;

(c) mounting a first clamping means onto the gate valve to apply a pressure onto the first end of the stem to keep the disc in an obturating position;

(d) untying the packing box from the gate valve and sliding said packing box at least partially along the stem;

(e) removing the packing ring from the shouldering of the stem;

(f) mounting a second clamping means onto the gate valve to apply a pressure onto the shouldering of the stem to keep the disc in the obturating position;

(g) removing the first clamping means from the stem;

(h) sliding and removing the packing box and the packing ring from the stem;

(i) inserting a new packing ring along the stem;

(j) putting back the packing box along the stem;

(k) mounting again the first clamping means onto the gate valve to apply a pressure onto the first end of the stem to keep the disc in the obturating position;

(l) removing the second clamping means from the shouldering;

(m) positioning the new packing ring onto the shouldering of the stem;

(n) fixing the packing box onto the gate valve to keep the disc in the obturating position by applying a pressure onto the shouldering of the stem via the packing ring;

(o) removing the first clamping means from the stem;

(p) stuffing a new packing into the packing box, around the stem; and (q) putting back sequentially the gland, the gland flange and the hand wheel on the stem, the gate valve being now ready to operate with the equipments.

Also according to the present invention, there is provided a maintenance kit for a gate valve which has a body, a hand wheel for closing or opening the valve by means of a stem provided with a first end connected to the hand wheel and a second end connected to a disc for obturating the valve, and several components placed together around and along the stem, which, starting from the one of the components that is closest to the hand wheel, include a gland flange, a gland, a packing, a packing box and a packing ring, the packing ring being squeezed between a shouldering of the stem and the packing box, the maintenance kit comprising:

first clamping means for applying a pressure onto the first end of the stem once the hand wheel has been removed therefrom to block the disc in an obturating position, the first clamping means having a first part for applying a pressure against the first end of the stem, and a second part for fixing the first part with respect to the body; and second clamping means for applying a pressure on the shouldering of the stem when the hand wheel has been removed therefrom and once the gland flange, the gland and the packing box have been raised from the shouldering to block the disc in the obturating position, said second clamping means having a first part for applying a pressure against the shouldering and a second part for fixing the first part of the second clamping means with respect to the body.

The objects, advantages and other features of the present invention will become more apparent upon reading of the following nonrestrictive description of preferred embodiment thereof, given for the purpose of exemplification only with reference to the accompanying drawings.

DETAILED DESCRIPTION OF THE DRAWINGS

Figure 1:
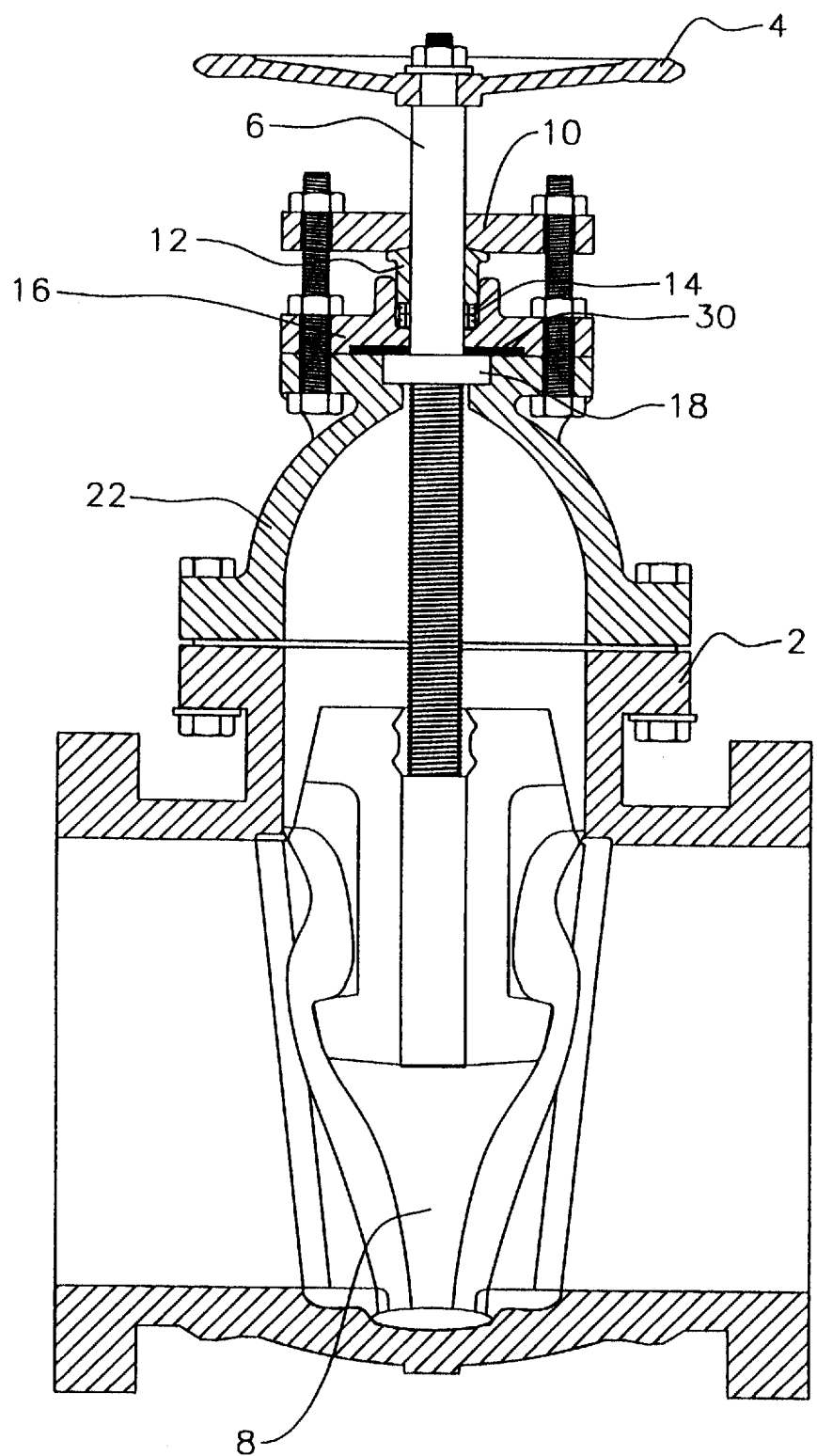
FIG. 1 is a cross section view of a gate valve.

The present maintenance method is for a gate valve of the non-rising stem type such as the gate valve known under the trademark of Jenkins, model No. 452J. Referring now to FIG. 1, there is shown a gate valve of this type, which has a body 2, a hand wheel 4 for closing or opening the valve by means of a stem 6 provided with a first end connected to the hand wheel 4 and a second end connected to a disc 8 for obturating the valve. The gate valve has also several components placed together around and along the stem 6, which, starting from the one of the components that is closest to the hand wheel 4, include a gland flange 10, a gland 12, a packing 14, a packing box 16 and a packing ring 30. The packing ring 30 is squeezed between a shouldering 18 of the stem 6 and the packing box 16. The gate valve has a bonnet 22 located around the stem 6. The lower part of the bonnet 22 is fixed onto the body 2. The packing box 16 is fixed onto the upper part of the bonnet 22.

Figure 2:
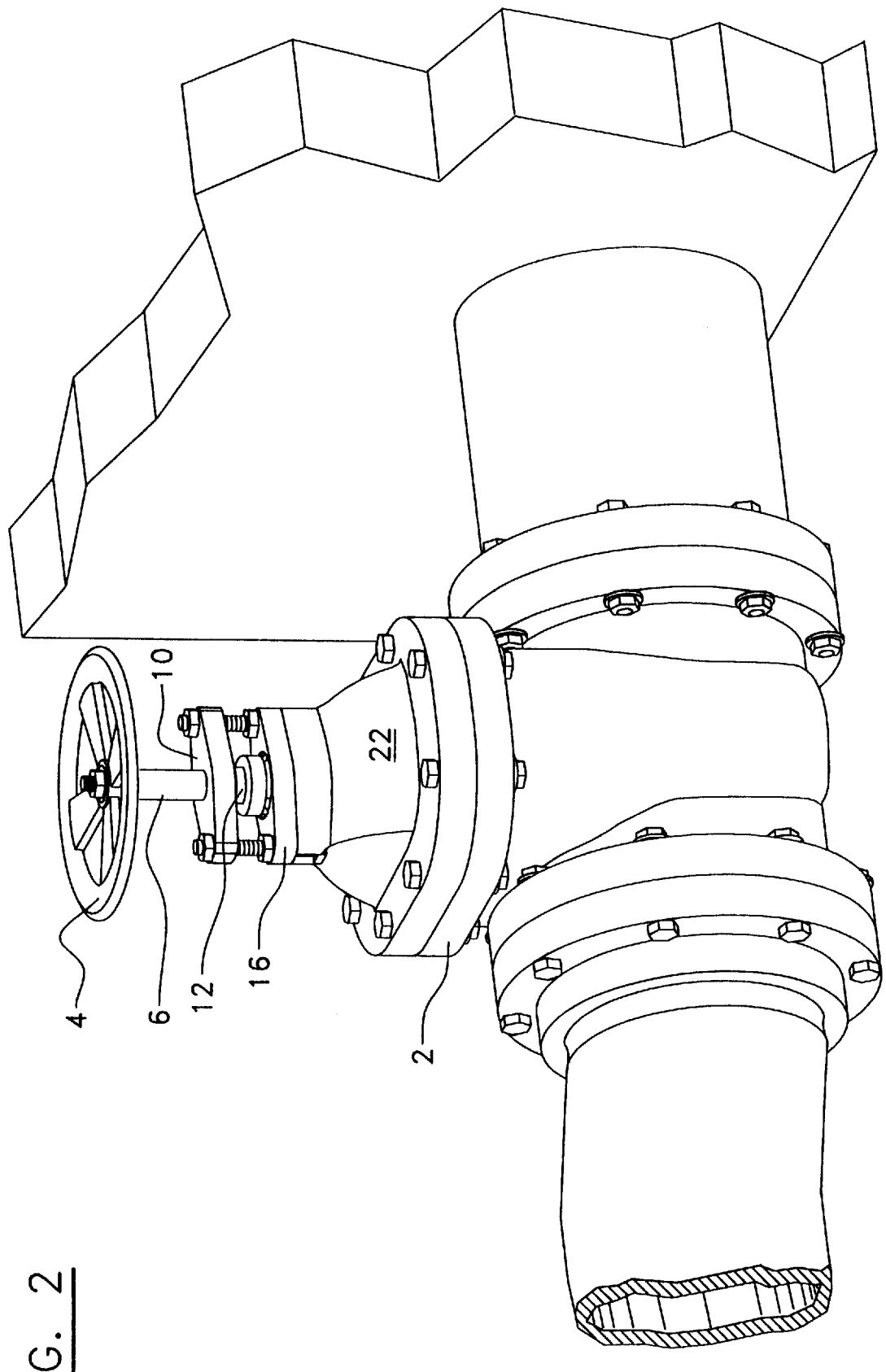
FIG. 2 is a perspective view of the gate valve in a typical installation.

Referring now to FIG. 2, there is shown a gate valve installed in an operating position. The first step of the maintenance method for the gate valve is to close the gate valve by means of the hand wheel 4, and to stop the pump and other equipments (not shown) if any operating with the gate valve. During the maintenance, the pressure of the fluid controlled by the valve should be kept within a certain limit. This limit depends An the situation. For example, for gate valve of 4, 6 and 8 inches known under the trademark of JENKINS, model 452J the pressure should not exceed 15 psi. A visual inspection of the gate valve is performed to see anomalies or cracks in the valve, and to see whether any part is missing. Also, while the maintenance steps are performed, any part of the gate valve that is disassembled is verified and replaced when it is considered defective.

Figure 3:
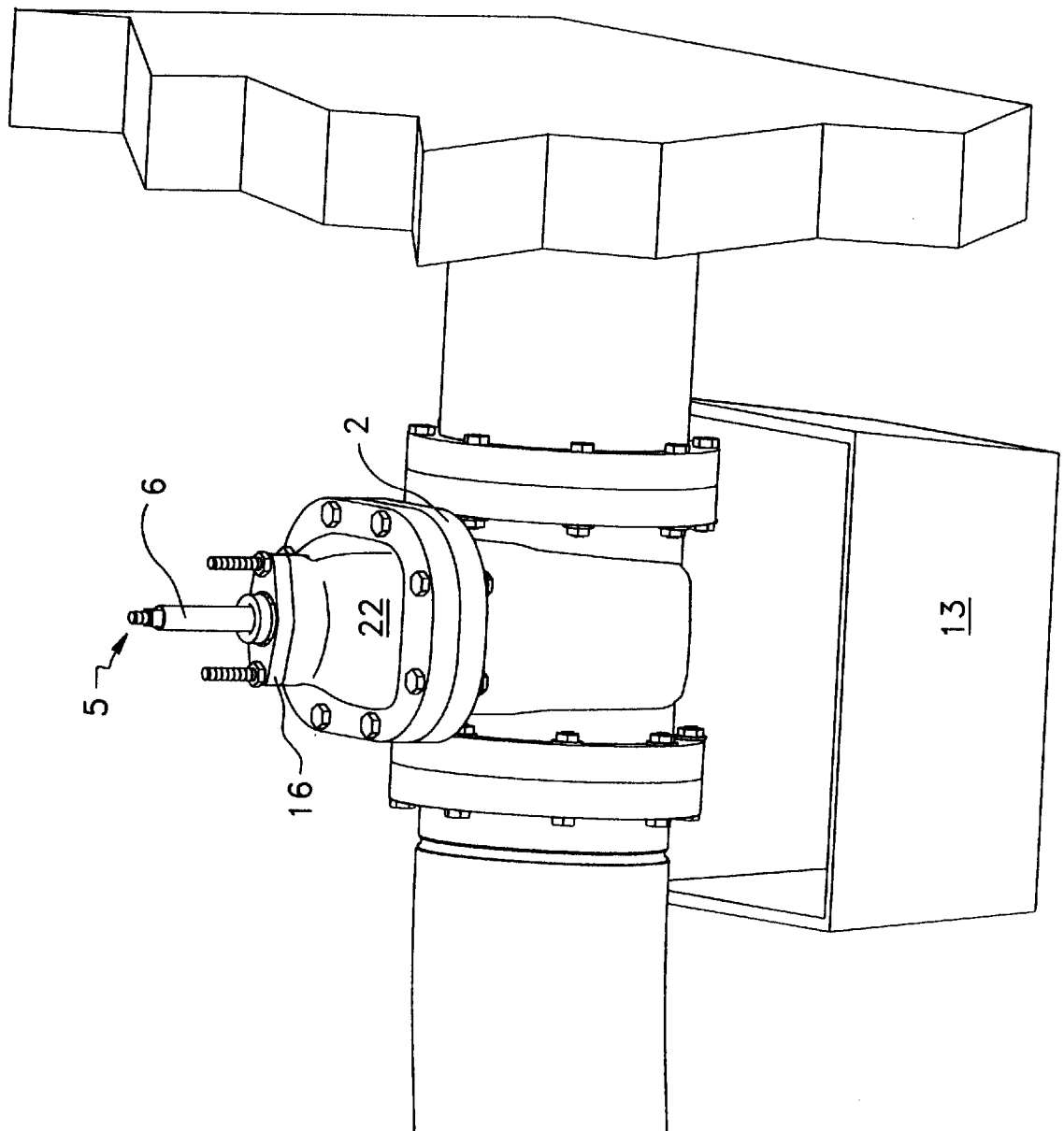
FIG. 3 is a perspective view of the gate valve of FIG. 2 with the hand wheel, the gland flange, the gland and the packing removed.

Referring now to FIG. 3, there is shown the next step of the method where the hand wheel 4 (shown in FIGS. 1 and 2), the gland flange 10 (shown in FIGS. 1 and 2), the gland 12 (shown in FIGS. 1 and 2) and the packing 14 (shown in FIG. 1) have been sequentially removed from the stem 6. The packing can be removed by means of a corkscrew. It can also be seen in FIG. 3 that a box 13 is placed underneath the gate valve for collecting any liquid that might leak out of the gate valve.

Figure 4:
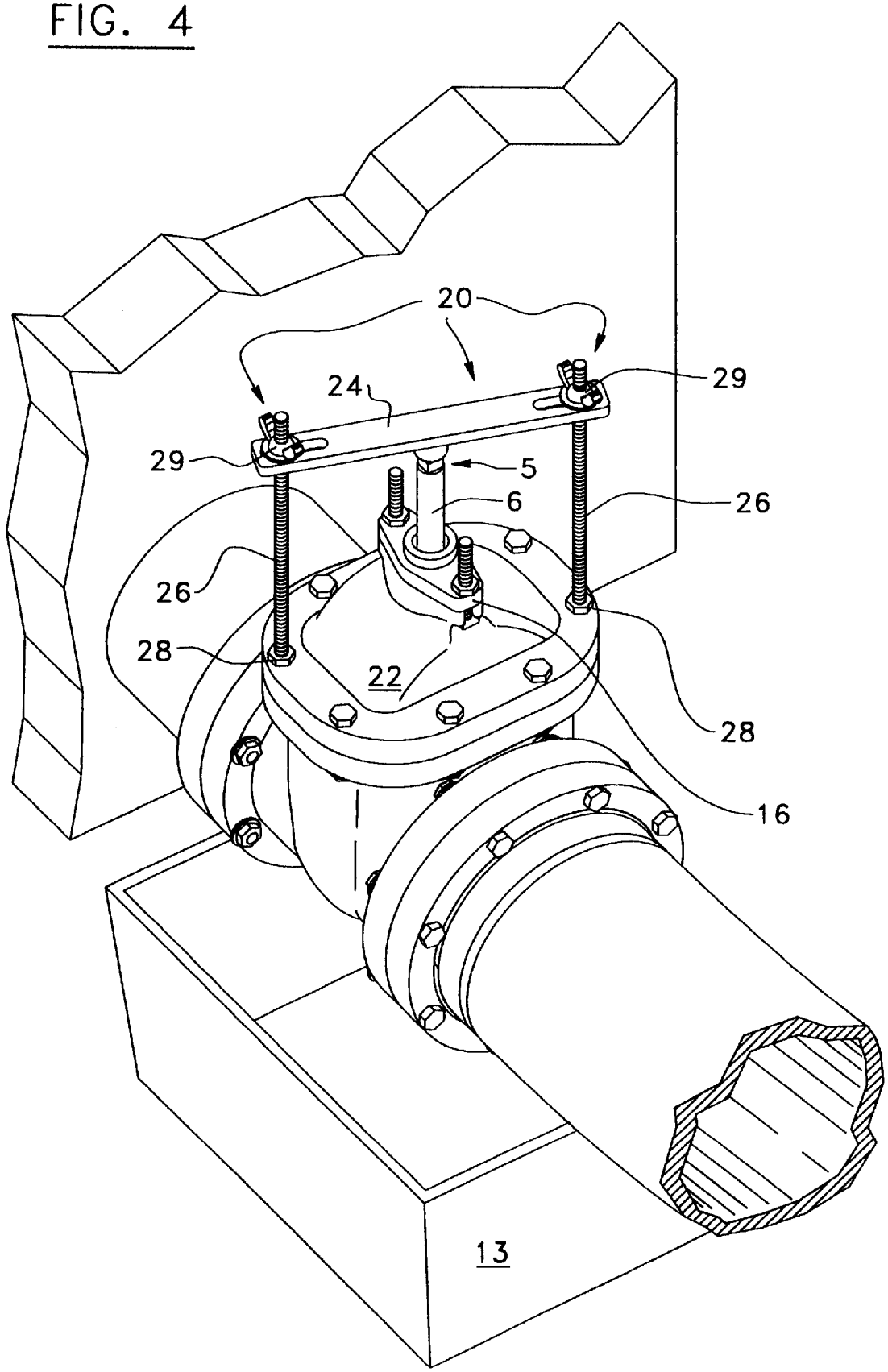
FIG. 4 is a perspective view of the gate valve of FIG.3 with first clamp installed.

Referring now to FIG. 4, there is shown the next step of the method where a first clamp 20 is mounted onto the gate valve to apply a pressure onto the first end 5 of the stem 6 so as to keep the disc 8 (shown in FIG. 1) in an obturating position.

Preferably, the first clamp 20 comprises a bar 24 having a median portion apt to apply a pressure onto the first end 5 of the stem 6 and two threaded rods 26 perpendicular to the bar 24 and solid with the extremities thereof. The first clamp 20 is mounted onto the gate valve by, first, screwing lower ends of the threaded rods 26 with nuts 28 onto the bonnet 22 and, second, bolting upper ends of the rods 26 by means of wing nuts 29. Preferably, for the Jenkins valve, the wing nuts 29 are tightened up with a pressure of the order of 1.4 N.m to 6.1 N.m.

Figure 5:
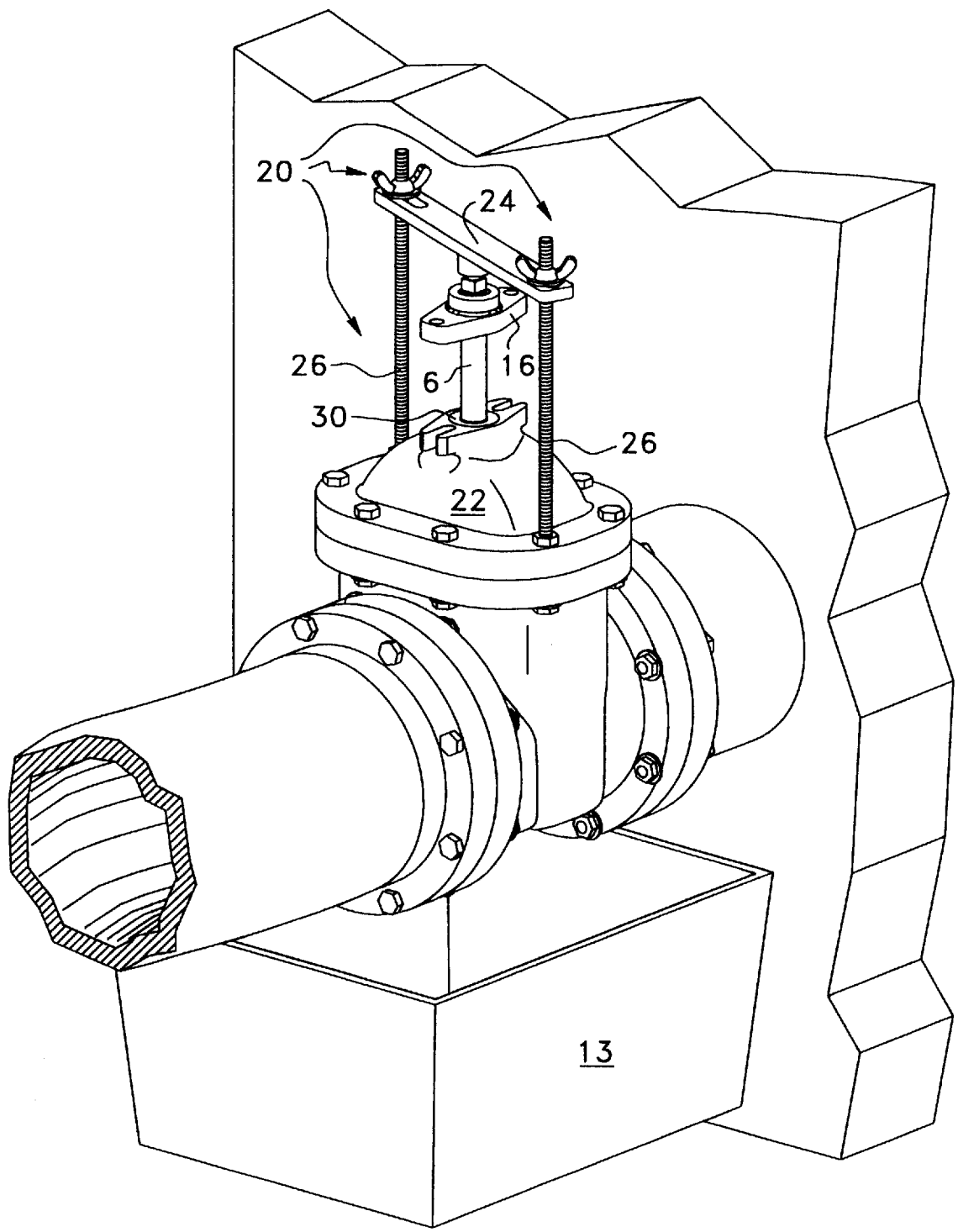
FIG. 5 is a perspective view of the gate valve of FIG. 4 with the packing box raised.

Referring now to FIG. 5, there is shown the next step of the method where the packing box 16 is untied from the bonnet 22 and slid upward partially along the stem 6. The packing box 16 is held in an upper position by attaching it to the bar 24.

Figure 6:
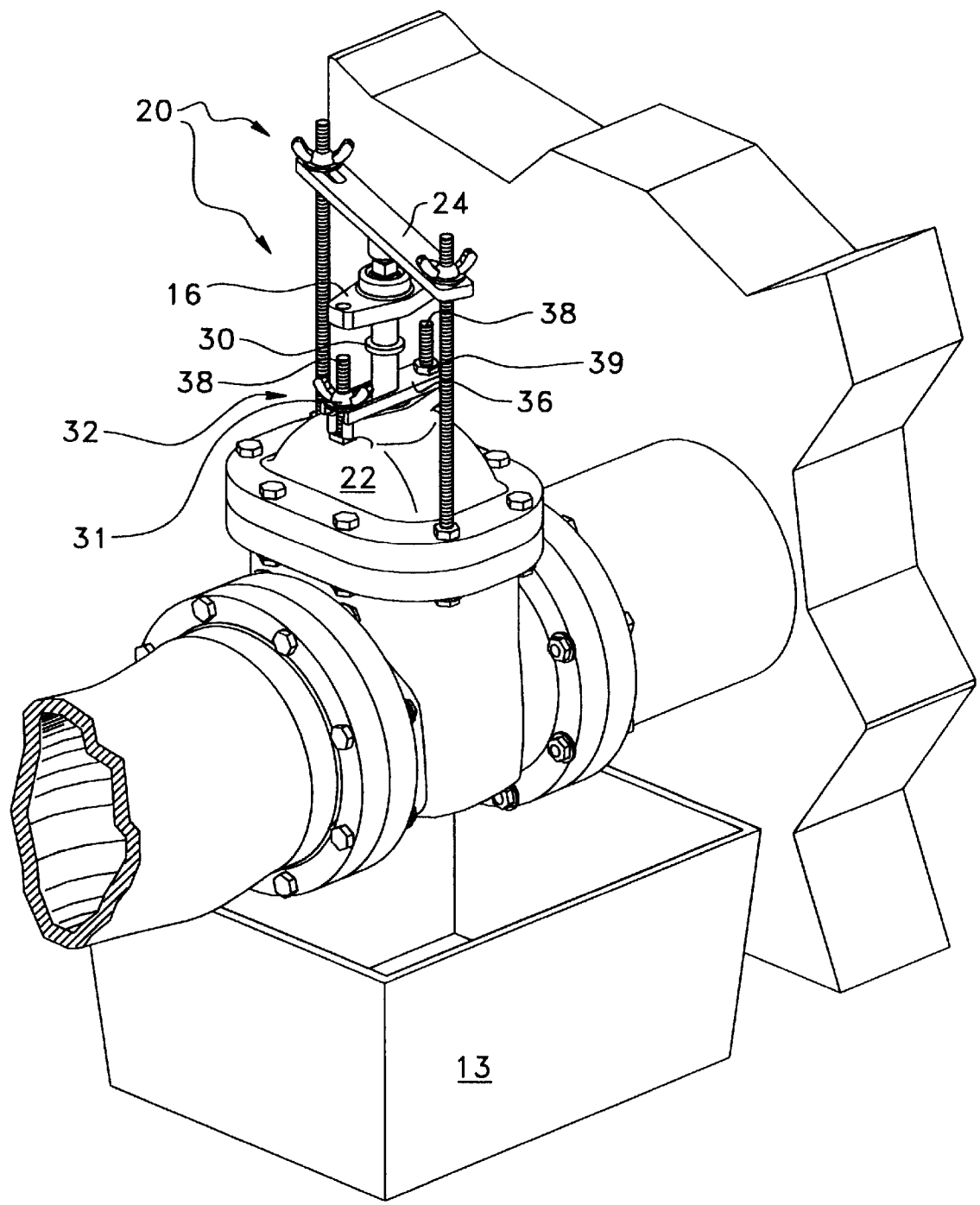
FIG. 6 is a perspective view of the gate valve of FIG. 5 with second clamp installed.

Referring now to FIG. 6, there is shown the next step of the method where the packing ring 30 is removed from the shouldering 18 (shown in FIG. 1) of the stem 6 by sliding it along the stem 6. A second clamp 32 is mounted onto the bonnet 22 to apply a pressure onto the shouldering 18 (shown in FIG. 1) of the stem 6 to keep the disc 8 (shown in FIG. 1) in the obturating position.

Preferably, the second clamp 32 comprises a bar 36 having a median portion apt to apply a pressure onto the shouldering of the stem 6. The bar 36 is provided with a channel extending from one side of the bar to the bar's median portion, through which the stem 6 passes when the second clamp 32 is in the operating position. The bar 36 is fixed to the bonnet 22 by means of two threaded rods 38 perpendicular to the bar 36. The bar 36 of the second clamp 32 is fixed against the shouldering of the stem 6 by tighten up a nut 39 and a wing nut 31 respectively along free ends of the rods 38 against the bar 36. Preferably, for a Jenkins valve, the nuts 39 and 31 are tightened up with a pressure of the order of 1.4 N.m to 6.1 N.m.

Figure 7:
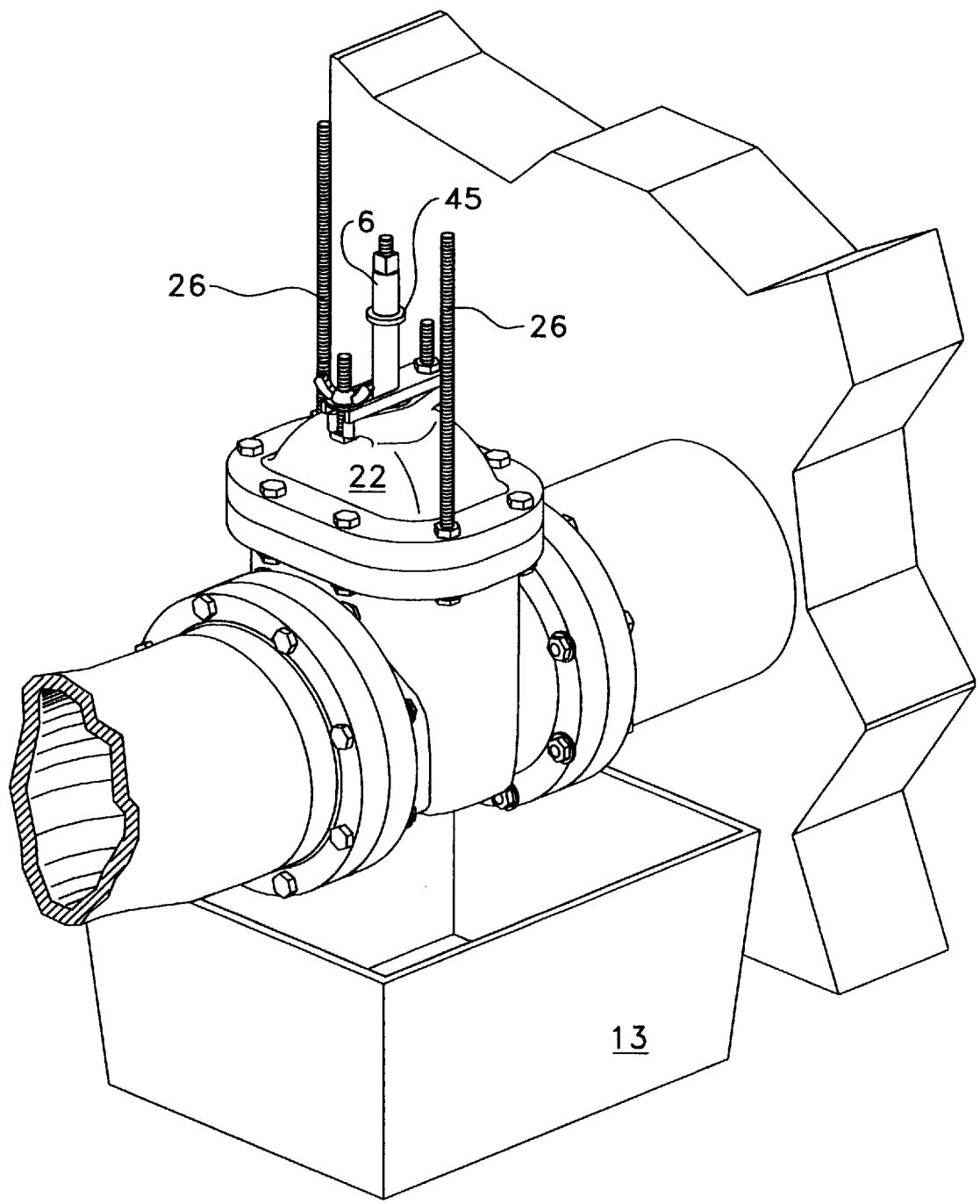
FIG. 7 is a perspective view of the gate valve of FIG. 6 with first clamp removed and a new packing ring inserted along the stem.

Referring now to FIG. 7, there is shown the next step of the method where the first clamp 20 (shown in FIG. 6) and the packing box 16 (shown in FIG. 6) are removed from the stem 6. After the complete removal of the packing ring 30 (shown in FIG. 6) from the stem 6, a new packing ring 45 is then inserted along the stem 6.

Figure 8:
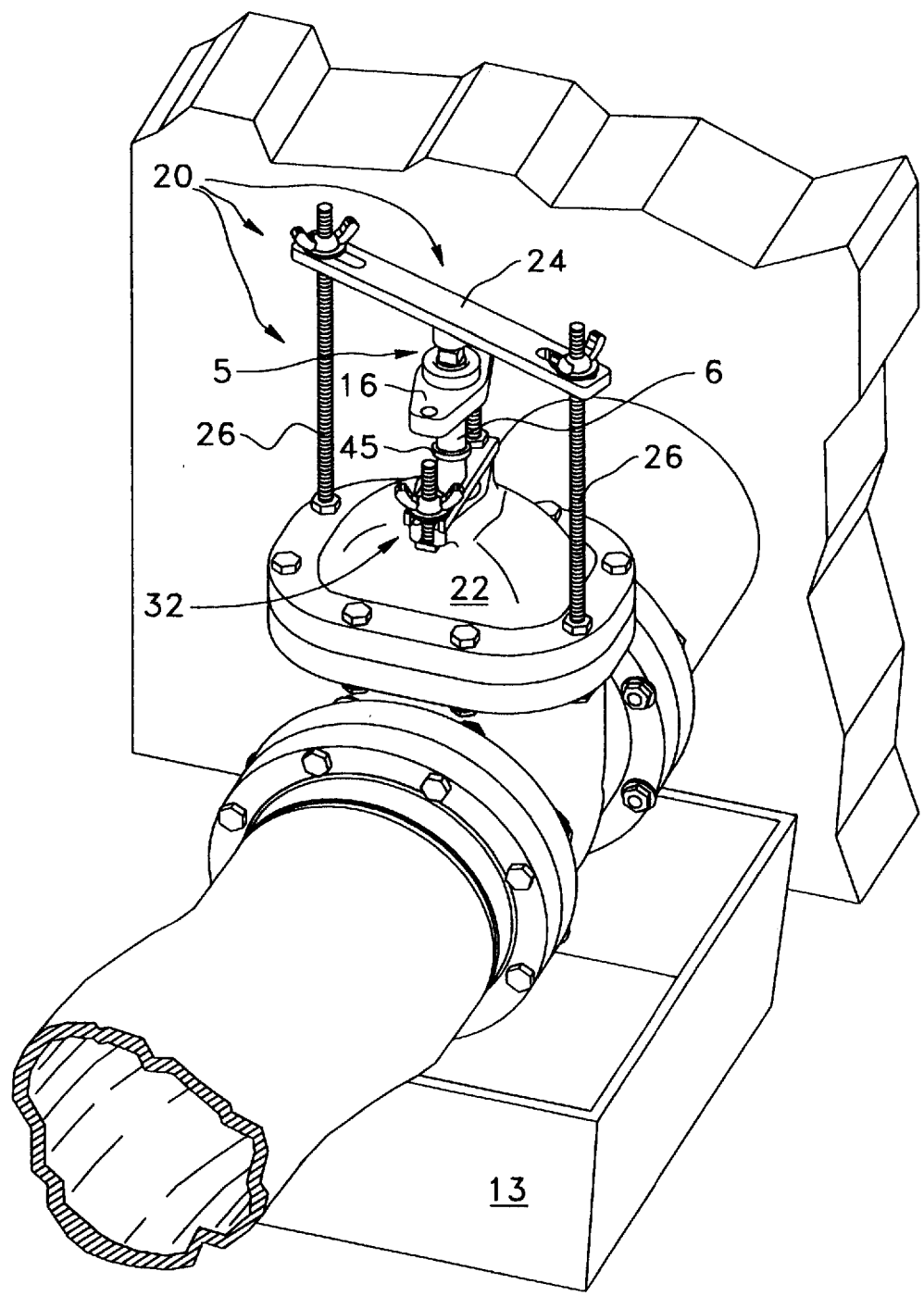
FIG. 8 is a perspective view of the gate valve of FIG. 7 with the new packing ring inserted along the stem, the packing box re-inserted along the stem and the first clamp re-installed.

Referring now to FIG. 8, there is shown the next step of the method where the packing box 16 is put back along the stem 6. Then, the first clamp 20 is mounted again onto the bonnet 22 to apply a pressure onto the first end 5 of the stem 6 to keep the disc 8 (shown in FIG. 1) in the obturating position.

Figure 9:
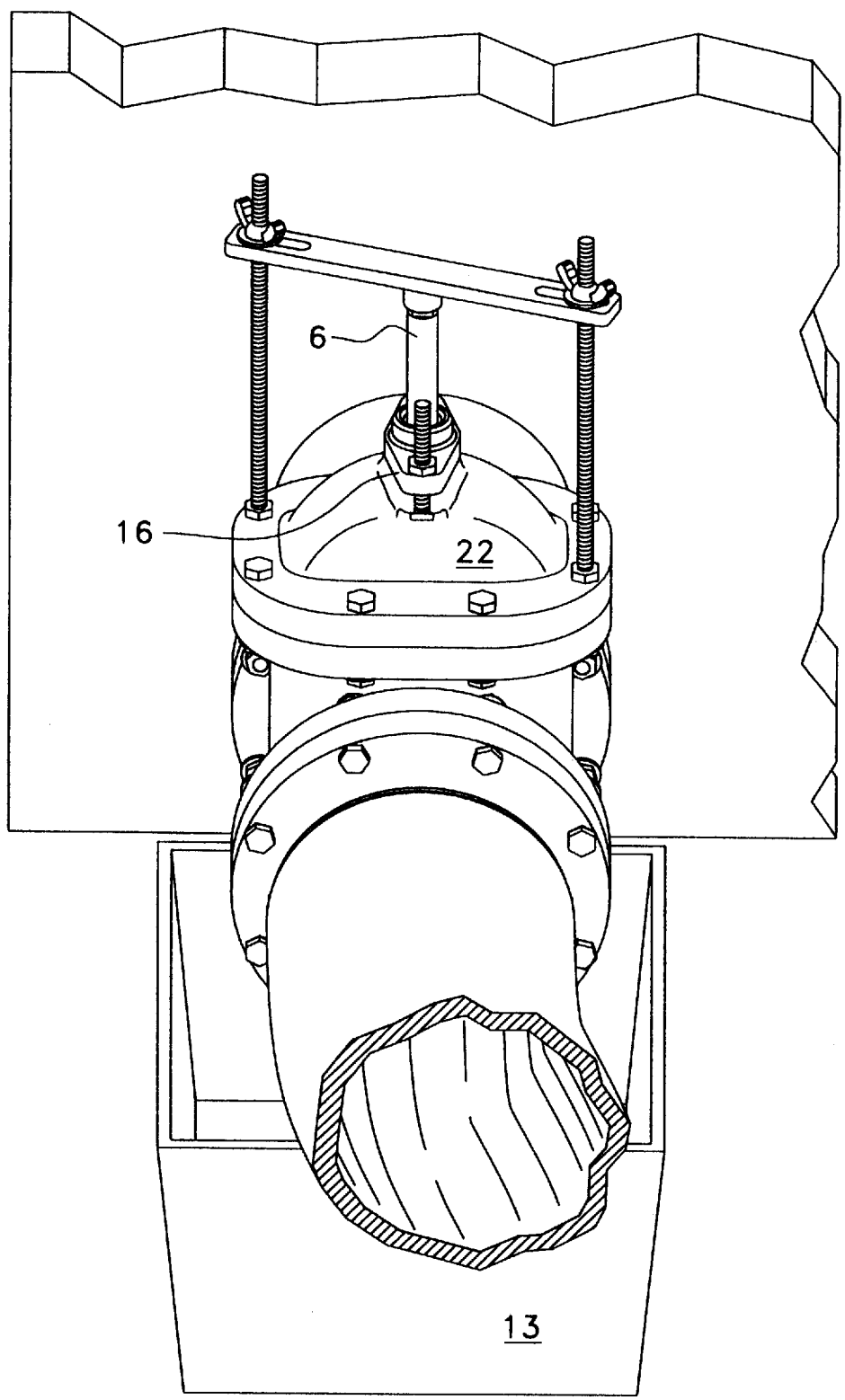
FIG. 9 is a perspective view of the gate valve of FIG. 8 with second clamp removed and packing box with packing ring re-installed.

Referring now to FIG. 9, there is shown the next step of the method where the second clamp 32 (shown in FIG. 8) is removed from the shouldering of the stem 6. The new packing ring can be then positioned onto the shouldering 18 (shown in FIG. 1) of the stem 6 and the packing box 16 is then fixed onto the bonnet 22 to keep the disc 8 (shown in FIG. 1) in the obturating position by applying a pressure onto the shouldering of the stem 6 via the packing ring.

Figure 10:
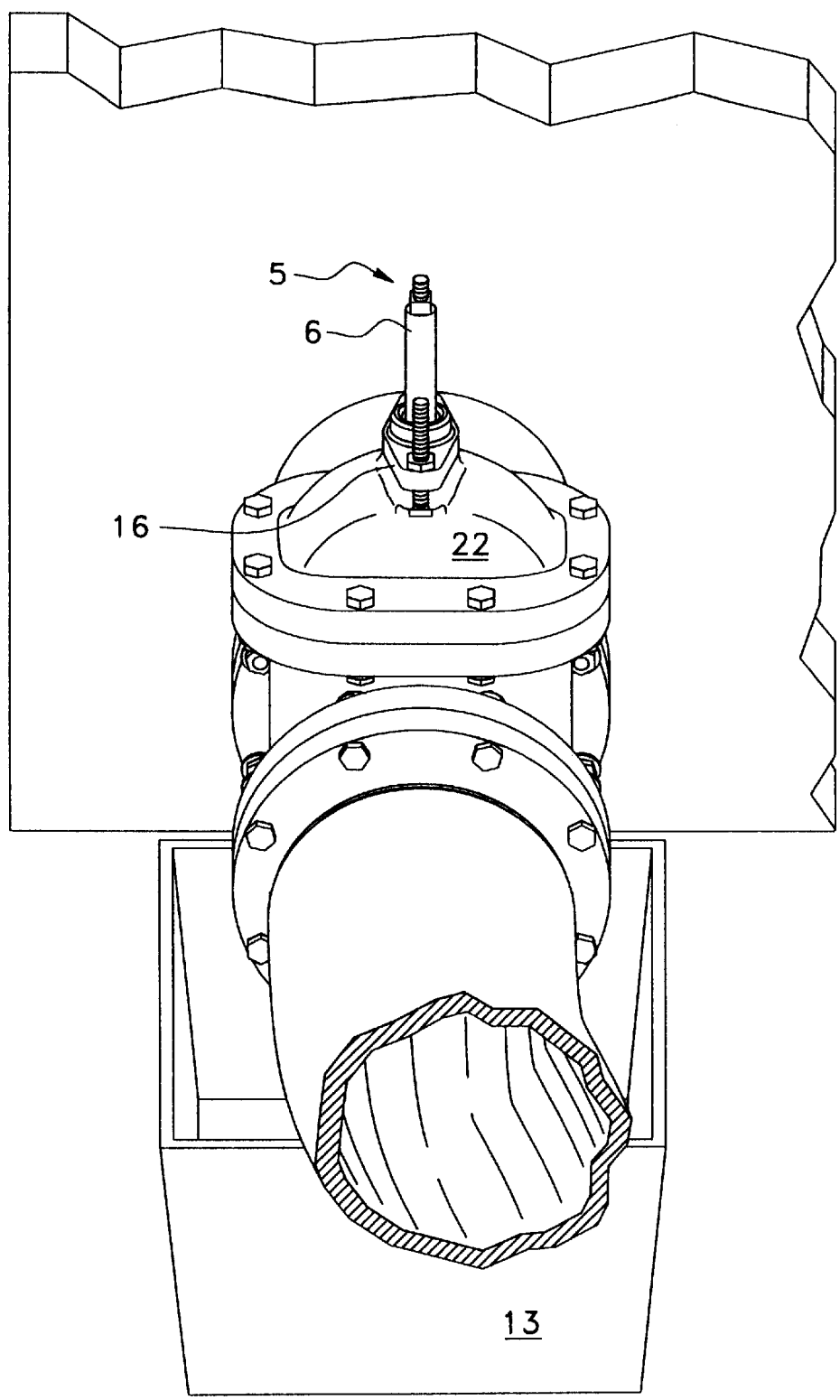
FIG. 10 is a perspective view of the gate valve of FIG. 9 with first clamp removed.

Referring now to FIG. 10, there is shown the next step of the method where the first clamp 20 (shown in FIG. 9) is removed from the bonnet 22. A new packing is stuffed into the packing box 16, around the stem 6. The gland 12 (shown in FIG. 1), the gland flange 10 (shown in FIG. 1) and the hand wheel 4 (shown in FIG. 1) can now be sequentially put back on the stem 6, so that the gate valve be ready to operate again with the surrounding equipments.

Figure 11:
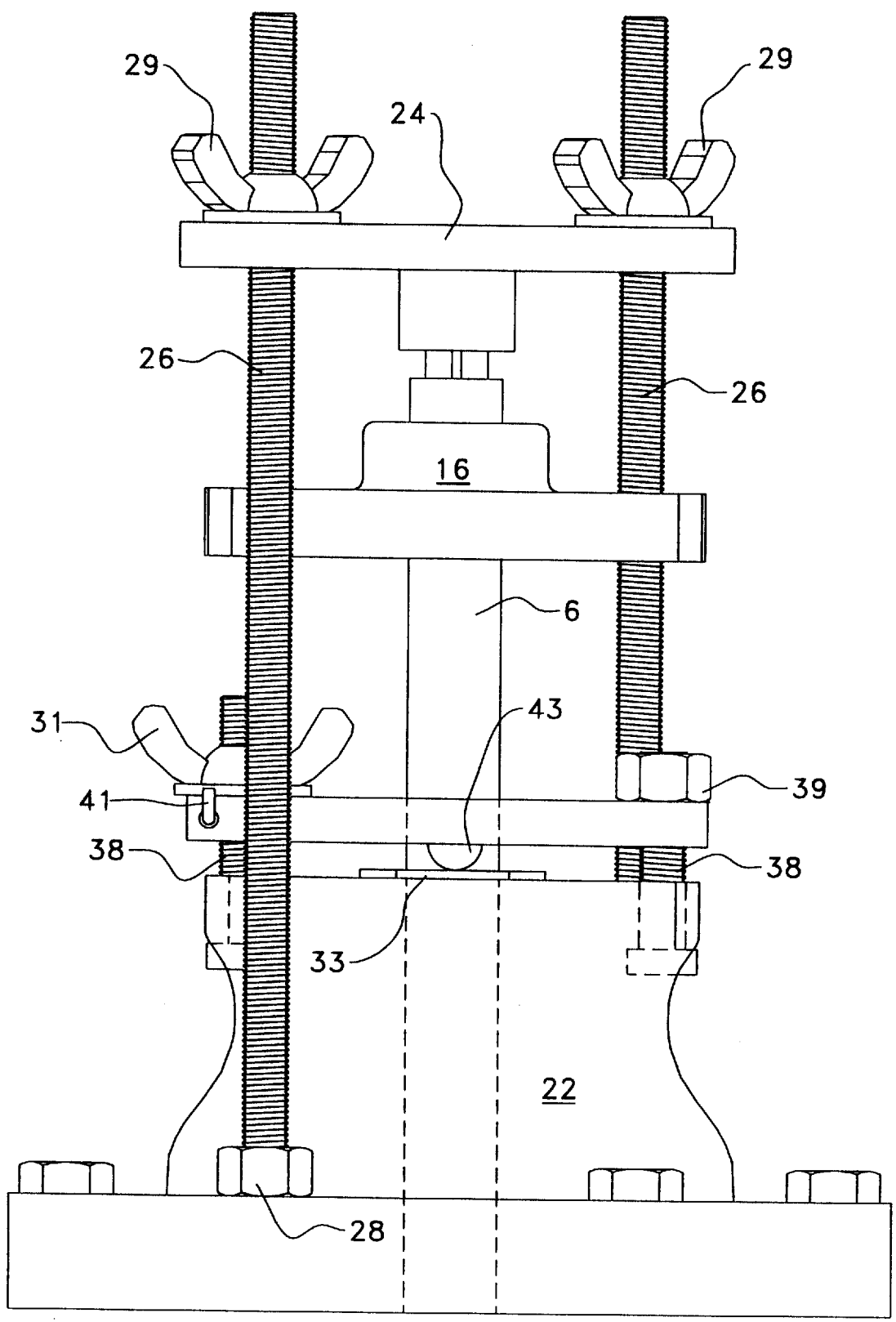
FIG. 11 is a side elevational view of the upper part of the gate valve while the first and second clamps are mounted.
Figure 12:
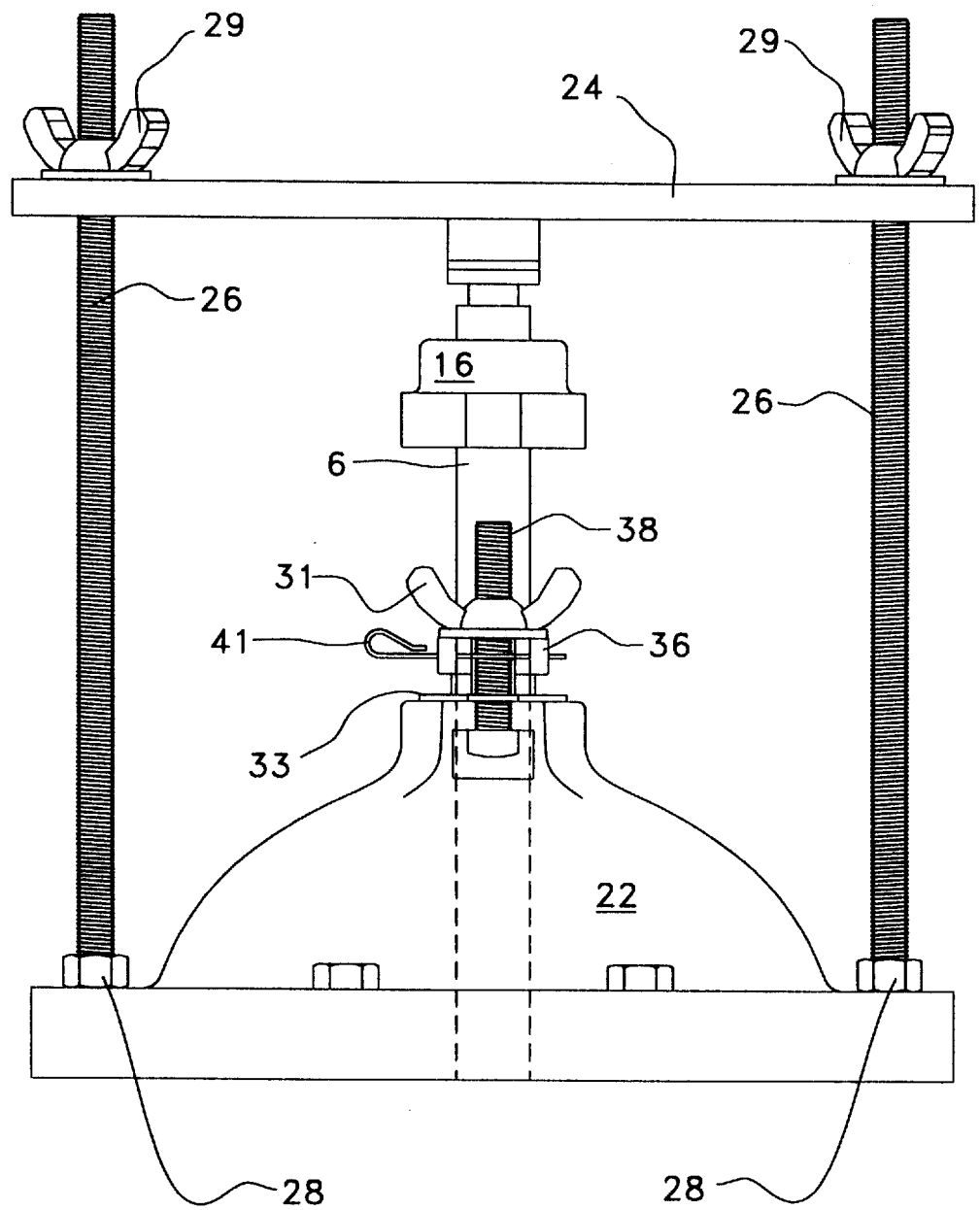
FIG. 12 is another side elevational view of the upper part of the gate valve while the first and second clamps are mounted.

Referring now to FIGS. 11 and 12, there are shown two different elevational side views of the upper part of the gate valve while the first and second clamps are mounted. There is shown that the first clamp comprises a bar 24, threaded rods 26, wing nuts 29 and the nuts 28. The packing box 16 is in a raised position. There is shown that the second clamp comprises a bar 36, threaded rods 38, a nut 39 and a wing nut 31. Furthermore the bar 36 is provided with two stops 43 that rest against the shouldering 18 (shown in FIG. 1) of the stem 6 via a Ushaped washer 33. Also, the second clamp comprises a pin 41 that is inserted into opposite holes made in the bar 36 for keeping the threaded rod 38 with the wing nut 31 in a proper position during the mounting of the second clamp.

Figure 13:
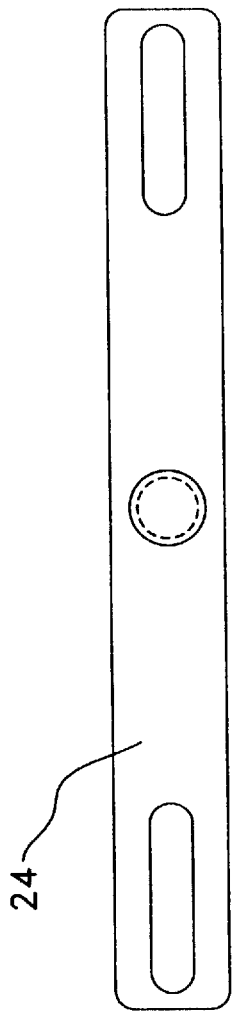
FIG. 13 is a bottom view of a preferred embodiment of the bar of the first clamp according to the present invention.
Figure 14:
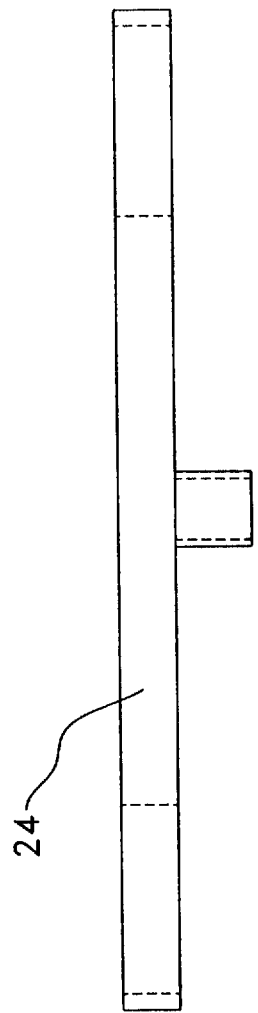
FIG. 14 is a side view of the bar shown in FIG. 13.

Referring now to FIGS. 13 and 14, there are shown respectively bottom and side views of the bar 24 of the first clamp.

Figure 15:
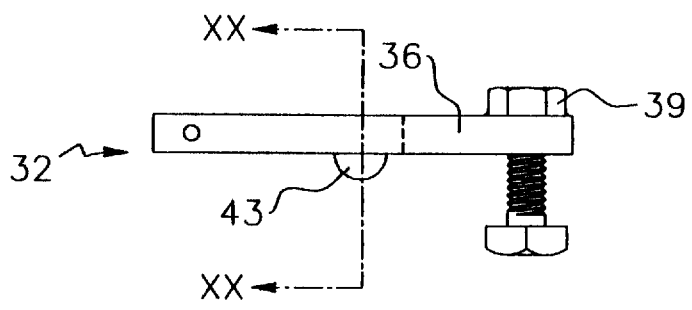
FIG. 15 is a side view of a preferred embodiment of the bar of the second clamp according to the present invention.

Referring now to FIG. 15, there is shown a side view of the bar 36 of the second clamp 32 including the nut 39 for fixing the bar 36.

Figure 16:
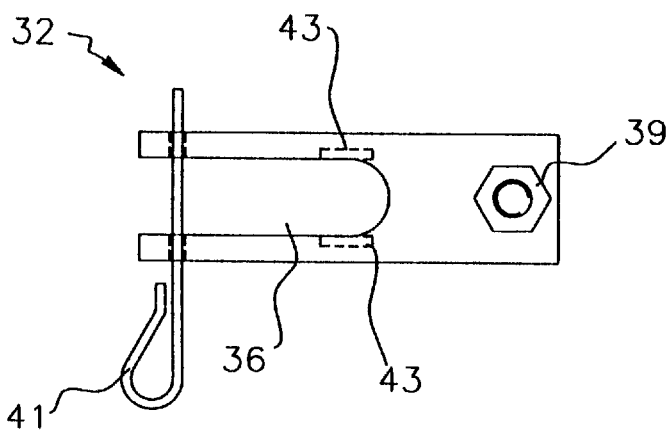
FIG. 16 is a top view of the preferred embodiment of the bar shown in FIG. 15.

Referring now to FIG. 16, there is shown a top view of the bar 36 of the second clamp 32 including the nut 39 for fixing the bar 36. There is also seen the channel 35 in the median portion of the bar 36 for passing the stem when the second clamp is mounted, and a pin 41 for keeping the threaded rod with the wing nut of the second clamp in a proper position during the mounting of the second clamp 32. This pin 41 is not shown in FIGS. 6, 7 and 8 to not overload the drawings.

Figure 17:
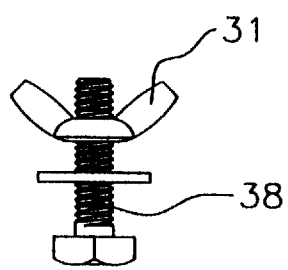
FIG. 17 is a side view of a preferred embodiment of the threaded rod with a washer and a wing nut, of the second clamp according to the present invention.

Referring now to FIG. 17, there is shown a side view of the threaded rod 38 with the wing nut 31 that is tightened for fixing the bar 36 of the second clamp 32 against the shouldering of the stem.

Figure 18:
FIG. 18 is a side view of a preferred embodiment of a spacer of the second clamp according to the present invention.
Figure 19:
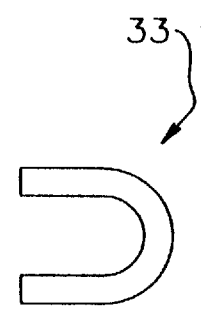
FIG. 19 is a top view of the preferred embodiment of the spacer shown in FIG. 18.

Referring now to FIGS. 18 and 19, there are shown respectively side and top views of the spacer 33 of the second clamp that is also shown in FIGS. 11 and 12.

Figure 20:
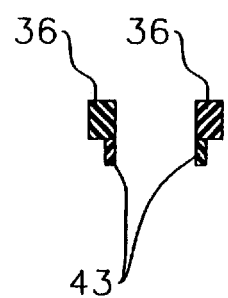
FIG. 20 is a cross section view along lines XX—XX of FIG. 15.

Referring now to FIG. 20, there is shown a cross section view of the bar 36 shown in FIG. 15. The stops 43 that can also be seen in FIGS. 11, 15 and 16 are shown.

Although the present invention has been explained hereinabove by way of preferred embodiments thereof, it should be pointed out that any modifications to these preferred embodiments, within the scope of the appended claims, are not deemed to change or alter the nature and scope of the present invention.

What is claimed is:

1. A maintenance method for a gate valve which has a body, a hand wheel for closing or opening the valve by means of a stem provided with a first end connected to the hand wheel and a second end connected to a disc for obturating the valve, and several components placed together around and along the stem, which, starting from the one of the components that is closest to the hand wheel, include a gland flange, a gland, a packing, a packing box and a packing ring, the packing ring being squeezed between a shouldering of the stem and the packing box, the method comprising:

(a) closing the gate valve by means of the hand wheel, and stopping operation of equipments operating with the gate valve;

(b) removing sequentially the hand wheel, the gland flange, the gland and the packing from the stem;

(c) mounting a first clamping means onto the gate valve to apply a pressure onto the first end of the stem to keep the disc in an obturating position;

(d) untying the packing box from the gate valve and sliding said packing box at least partially along the stem;

(e) removing the packing ring from the shouldering of the stem;

(f) mounting a second clamping means onto the gate valve to apply a pressure onto the shouldering of the stem to keep the disc in the obturating position;

(g) removing the first clamping means from the stem;

(h) sliding and removing the packing box and the packing ring from the stem;

(i) inserting a new packing ring along the stem;

(j) putting back the packing box along the stem;

(k) mounting again the first clamping means onto the gate valve to apply a pressure onto the first end of the stem to keep the disc in the obturating position;

(l) removing the second clamping means from the shouldering;

(m) positioning the new packing ring onto the shouldering of the stem;

(n) fixing the packing box onto the gate valve to keep the disc in the obturating position by applying a pressure onto the shouldering of the stem via the packing ring;

(o) removing the first clamping means from the stem;

(p) stuffing a new packing into the packing box, around the stem; and (q) putting back sequentially the gland, the gland flange and the hand wheel on the stem, the gate valve being now ready to operate with the equipments.

2. A maintenance method according to claim 1, for the case where the gate valve includes a bonnet located around the stem and having a lower part fixed to the body and an upper part onto which the packing box is fixed, the mounted first clamping means comprising:

a bar having a median portion for applying a pressure onto the first end of the stem; and two threaded rods perpendicular to the bar and solid with extremities thereof, the bar of the first clamping means being applied against the first end of the stem by, first, screwing lower ends of the threaded rods onto the bonnet, and, second, tightening up wing nuts respectively along free ends of the rods against the bar.

3. A maintenance method according to claim 1, for the case where the gate valve includes a bonnet located around the stem and having a lower part fixed to the body and an upper part onto which the packing box is fixed, the mounted second clamping means comprising:

a bar having a median portion for applying a pressure onto the shouldering of the stem, the median portion of the bar being provided with a channel through which the stem passes when the second clamping means is in an operating position; and two threaded rods perpendicular to the bar and solid with extremities thereof, the bar of the second clamping means being applied against the shouldering of the stem by, first, screwing lower ends of the threaded rods onto the bonnet, and, second, tightening up a nut and a wing nut respectively along free ends of the rods against the bar.

4. A maintenance kit for a gate valve which has a body, a hand wheel for closing or opening the valve by means of a stem provided with a first end connected to the hand wheel and a second end connected to a disc for obturating the valve, and several components placed together around and along the stem, which, starting from the one of the components that is closest to the hand wheel, include a gland flange, a gland, a packing, a packing box and a packing ring, the packing ring being squeezed between a shouldering of the stem and the packing box, the maintenance kit comprising:

first clamping means for applying a pressure onto the first end of the stem once the hand wheel has been removed therefrom to block the disc in an obturating position, the first clamping means having a first part for applying a pressure against the first end of the stem, and a second part for fixing the first part with respect to the body; and second clamping means for applying a pressure on the shouldering of the stem when the hand wheel has been removed therefrom and once the gland flange, the gland and the packing box have been raised from the shouldering to block the disc in the obturating position, said second clamping means having a first part for applying a pressure against the shouldering and a second part for fixing the first part of the second clamping means with respect to the body.

5. A maintenance kit according to claim 4, for the case where the gate valve includes a bonnet located around the stem and having a lower part fixed to the body and an upper part onto which the packing box is fixed, wherein:

the first part of the first clamping means comprises a bar having a median portion for applying a pressure onto the first end of the stem; and the second part of the first clamping means comprises two threaded rods perpendicular to the bar and solid with extremities thereof, the second clamping means being fixed with respect to the body by screwing free ends of the threaded rods onto the bonnet.

6. A maintenance kit according to claim 4, for the case where the gate valve includes a bonnet located around the stem and having a lower part fixed to the body and an upper part onto which the packing box is fixed, wherein:

the first part of the second clamping means comprises a bar having a median portion for applying a pressure onto the shouldering of the stem, the median portion of the bar being provided with a channel through which the stem passes when the second clamping means is fixed with respect to the body; and the second part of the second clamping means comprises two threaded rods perpendicular to the bar and solid with extremities thereof, the second clamping means being fixed with respect to the body by screwing free ends of the threaded rods onto the bonnet.

* * * * *